(No Model.)
5 Sheets—Sheet 1.
C. C. REYNOLDS.
PHONOGRAPH.
No. 287,166. Patented Oct. 23, 1883.
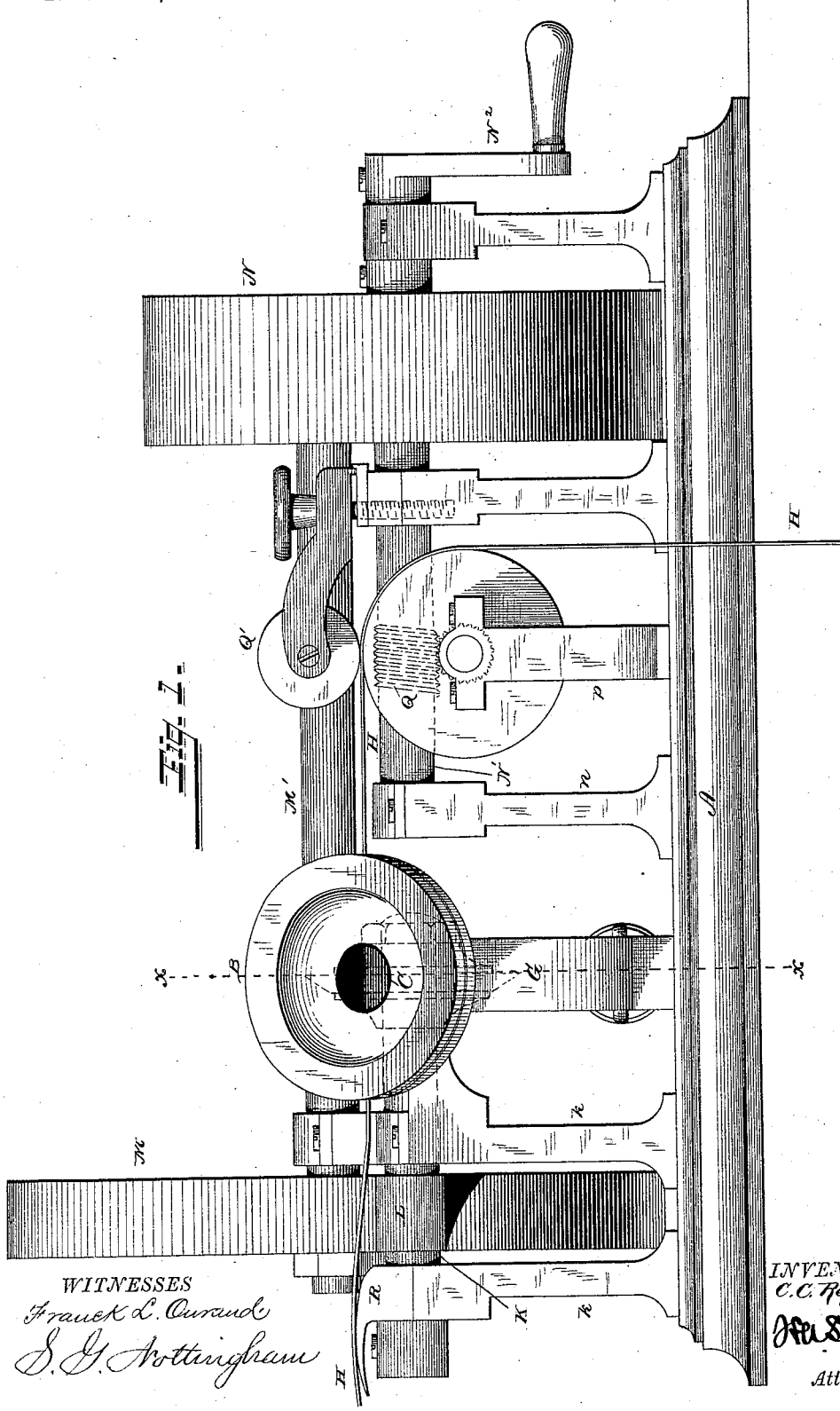
WITNESSES
Franck L. Ourand
S. G. Nottingham
INVENTOR
C. C. Reynolds.
Attorney

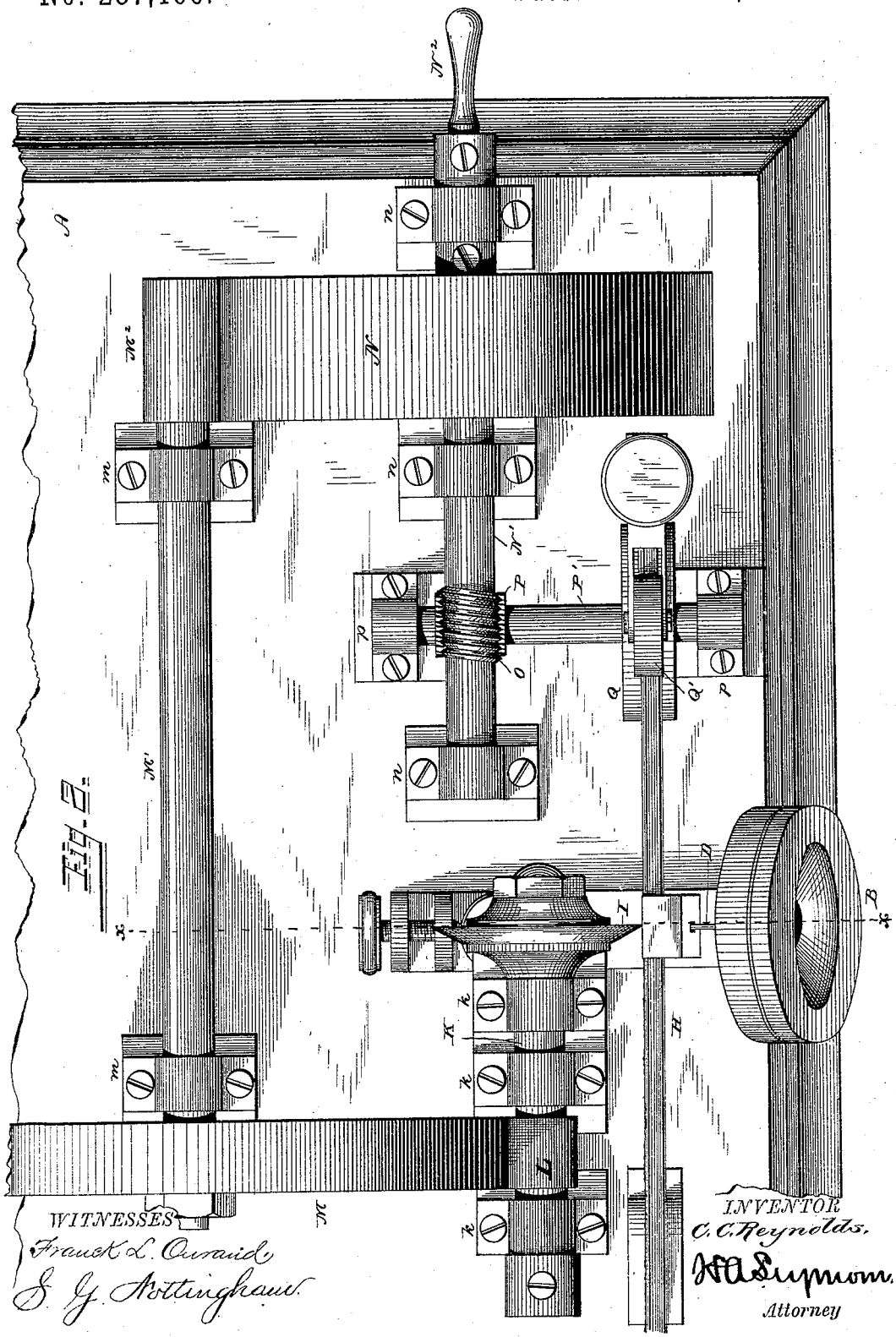

(No Model.) 5 Sheets—Sheet 3.
C. C. REYNOLDS.
PHONOGRAPH.
No. 287,166. Patented Oct. 23, 1883.
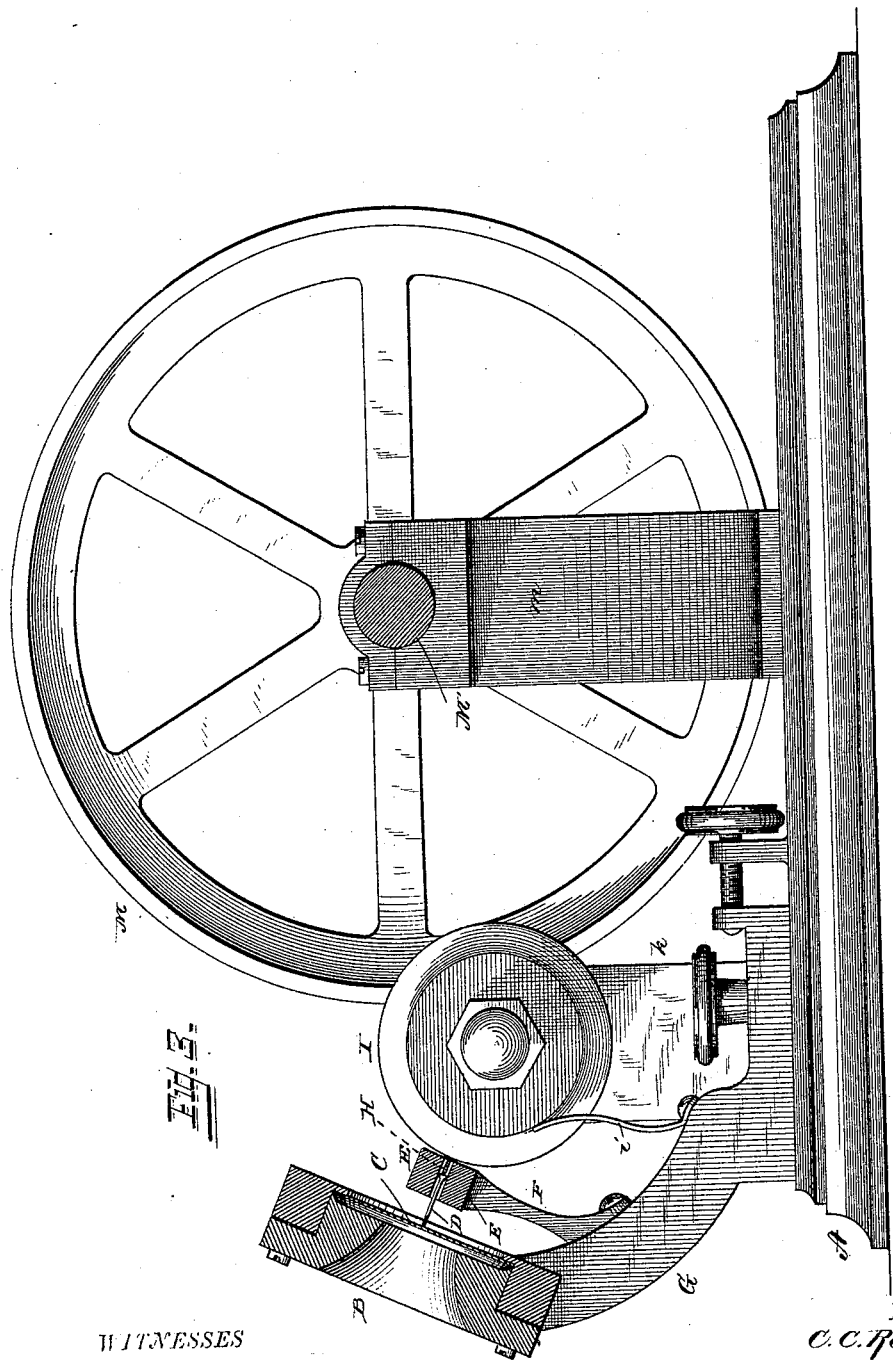
WITNESSES
Franck L. Ourand
S. J. Nottingham
INVENTOR
C. C. Reynolds.
Attorney (No Model.) 5 Sheets—Sheet 4.
C. C. REYNOLDS.
PHONOGRAPH.
No. 287,166. Patented Oct. 23, 1883.
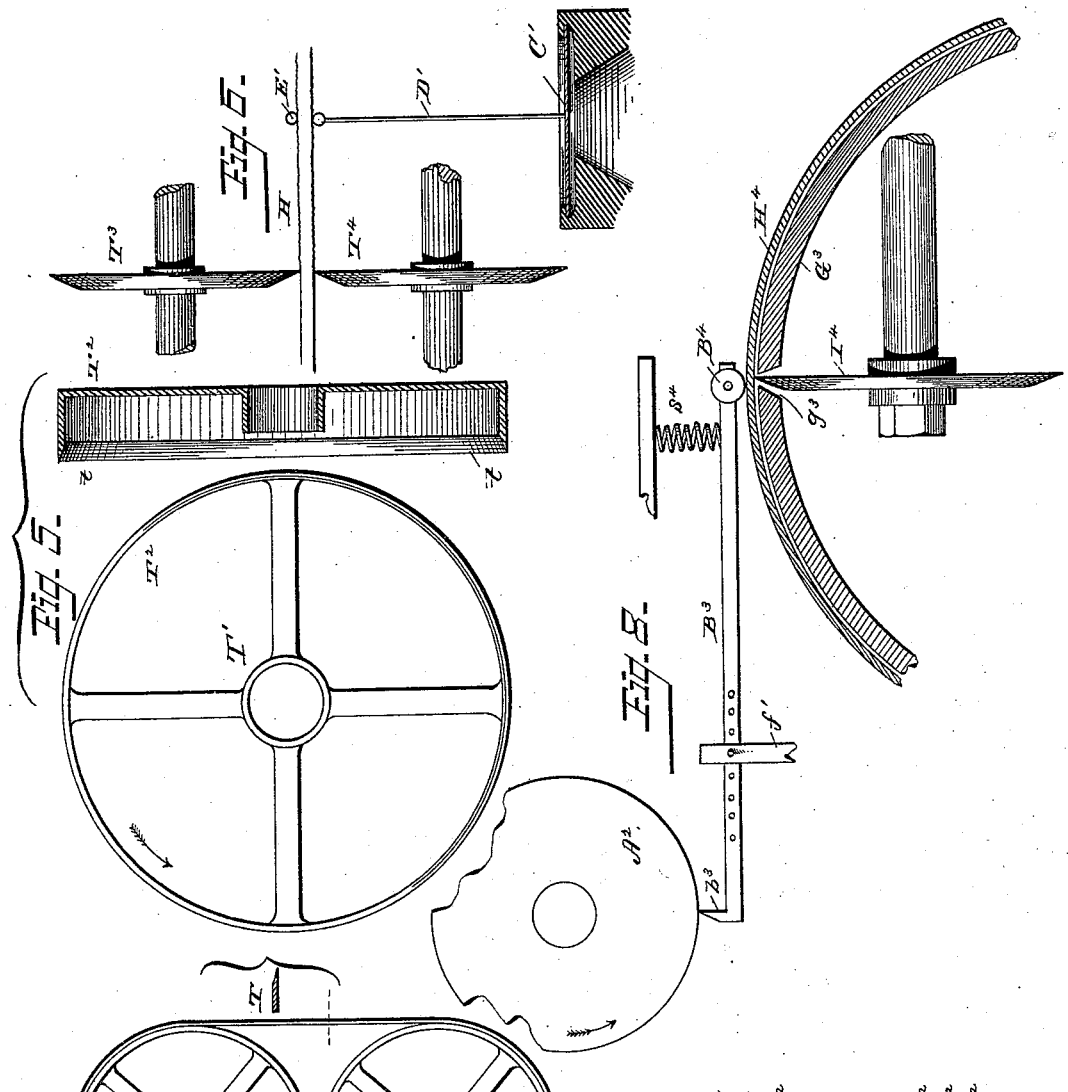
WITNESSES
INVENTOR
C. C. Reynolds.
Attorney

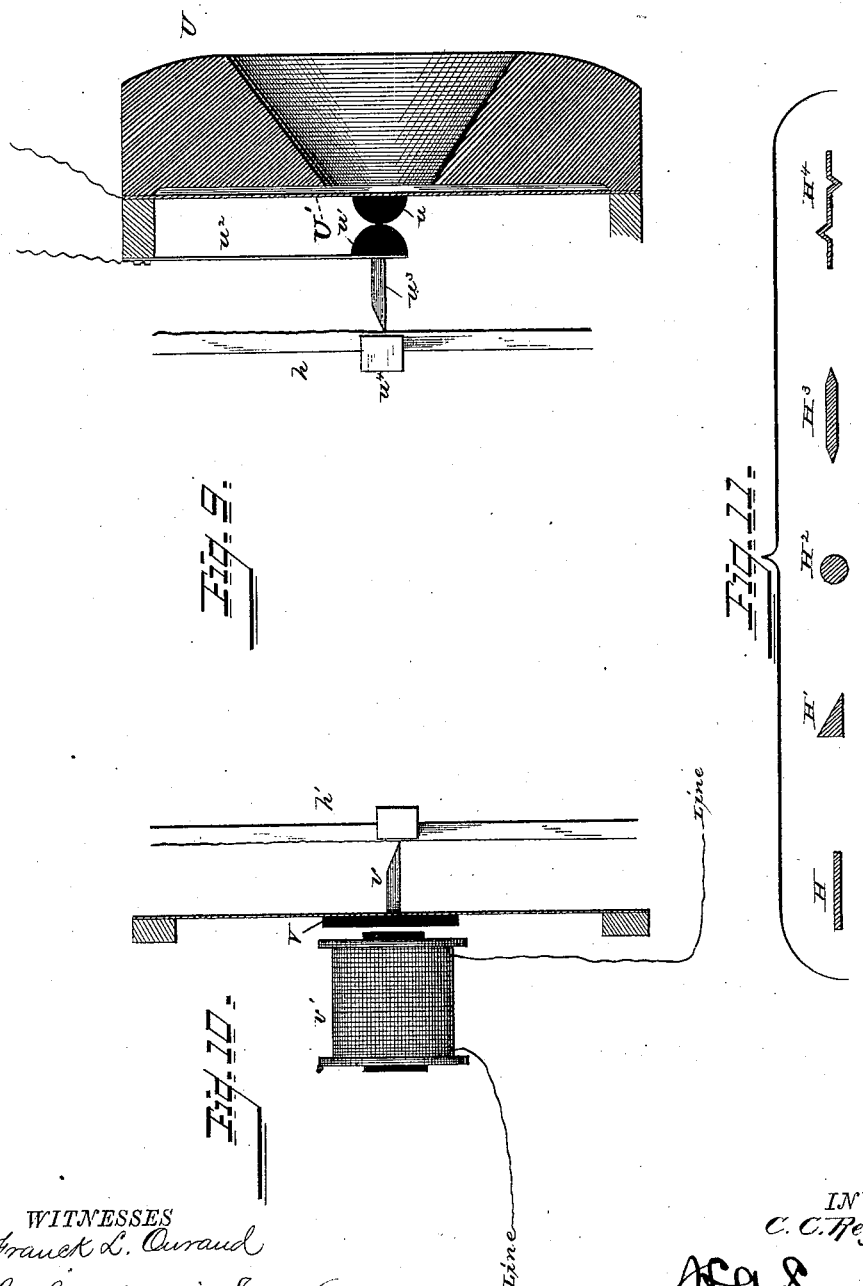

UNITED STATES PATENT OFFICE.

CHRISTOPHER C. REYNOLDS, OF PRESCOTT, ARIZONA TERRITORY.

PHONOGRAPH.

SPECIFICATION forming part of Letters Patent No. 287,166, dated October 23, 1883.

Application filed May 28, 1883. (No model.)

*To all whom it may concern:*

Be it known that I, CHRISTOPHER C. REYNOLDS, of Prescott, in the county of Yavapai and Territory of Arizona, have invented certain new and useful Improvements in Phonographic Instruments; and I do hereby declare the following to be a full, clear, and exact description of the invention, such as will enable others skilled in the art to which it appertains to make and use the same.

This invention relates to improvements in phonographic instruments, and methods by which are produced permanent records of sounds in such form that the sounds may be reproduced through the instrumentality of the records.

Instruments of this class as heretofore constructed have produced the sound-record by embossing or indenting a sheet of tin-foil or similar thin and pliable material, which is supported upon a revolving cylinder or plate to receive the action of a recording-stylus, which is forced directly against the sheet by a diaphragm vibrating in response to sounds, the said cylinder or plate being grooved spirally in order to permit the record-sheet to be forced into the groove to raise the record on one side of the sheet, while it is sunken or indented on the other side. The disadvantages of such an instrument are as follows: First, its capacity for continuous recording is limited by the dimensions of the cylinder or plate which supports the record-sheet; second, removing the sheet from its supporting plate or cylinder destroys the perfection of the record, as the embossing becomes more or less disarranged or obliterated as the thin and soft sheet is subjected to the handling and bending necessarily incident to its removal; third, the embossing is so delicate and fragile that it is distorted by the action of a stylus, with which it is moved in contact for the purpose of reproducing the sounds, and consequently the reproduction is not exact; and, fourth, the resistance which the record-sheet opposes to the recording-stylus prevents the diaphragm from having an amplitude of vibration commensurate with the force of the sound-waves projected against it, and therefore the reproduction will not have the volume or loudness of the original sounds.

It is the object of my invention to provide a phonographic apparatus which is not subject to the disadvantages above enumerated; and to this end it consists in a new method and certain novel constructions and combinations of devices, which will be clearly understood from the following particular description, in connection with the accompanying drawings, in which—

Figure 1 is a side elevation of a phonograph constructed according to my invention. Fig. 2 is a top view thereof. Fig. 3 is a section on the line *x x*, Figs. 1 and 2. Fig. 4 is a view in elevation and diametric section of a modified form of the record-cutter. Fig. 5 is a view in elevation and section of another modification of the record-cutter. Fig. 6 is a plan view of a portion of an instrument adapted to cut the record on both sides of the record-strip. Fig. 7 is a diametric section of a form of diaphragm adapted for use in my improved phonograph. Fig. 8 is a diagram illustrating the construction of an instrument for copying and amplifying an original record made by the old forms of instruments. Fig. 9 is a section of a portion of a telephone-transmitter adapted for transmitting sounds in connection with a record-strip produced by my improved instrument. Fig. 10 is a fragmentary section of another form of telephonic transmitter adapted for operation by the record-strip; and Fig. 11 is a view in cross-section of various forms of strips which may be used to receive the record.

In the drawings, the letter A indicates a base-board, upon which the various parts of my phonograph are mounted.

B is a mouth-piece, in which is secured a diaphragm, C, in the manner usual in such instruments, and from the center of this diaphragm projects a stem, D, corresponding to the stylus of the ordinary phonograph. The outer end of this stylus plays between two guides, E E, supported by an arm, F, which projects from the adjustable standard G, which carries the mouth-piece. These guides E are arranged to receive between them the traveling record-strip H, which is guided across the edge of a rotary cutter-plate, I, which is carried by a shaft, K, mounted in bearings at the tops of standards *k*, rising from the base-board. Said shaft has also fixed upon it a friction-wheel, L, which is driven by a larger friction-wheel, M, carried by a shaft, M', supported by standards m, and carrying at its opposite end a friction-pinion, M², which is driven by a main driving friction-wheel, N, carried by a shaft, N', which rotates in bearings on standards n. This shaft N' is provided with a worm-gear, o, which meshes with a tooth-pinion, P, mounted on a transverse shaft, P', supported by standards p, and having fixed upon it a friction feed-wheel, Q, over which passes the record-strip H, said strip being held properly in contact with the periphery of said feed-wheel by means of an adjustable pressure-wheel, Q'.

Near the opposite end of the base-board from the feed-wheel Q, and beyond the guides E E, is a guide, R, which also supports the record-strip and directs it properly between the guides E E. The record-strip, as shown in Fig. 1, is oblong in cross-section, as shown also at H in Fig. 11. It is to be made of a metal which will well support itself and resist ordinary wear—such, for instance, as copper, brass, iron, or soft untempered steel. The dimensions of the strip may be varied; but in practice a strip from one-eighth to three-sixteenths of an inch wide, and from one thirty-second to one-sixteenth of an inch thick, will be found to be of convenient size for general use. It is designed to cut into the edge of this strip indentations or notches corresponding to the record-indentation of the ordinary phonograph, this indented edge to be drawn in contact with a stylus connected with a reproducing-diaphragm in the ordinary manner, and thus reproducing the recorded sounds.

The operation of the apparatus as shown in the drawings will be readily understood. The record-strip H is first passed through the guide R, and then between the guides E in contact with the stem D, and on over the feed-wheel Q and under the pressure-wheel. The strip may be delivered from a suitable reel, (not shown in the drawings,) and after leaving the feed-wheel may be wound upon another reel, or disposed of in any desired manner. The guides and guide-wheel are so arranged that the edge of the strip H will lightly touch the edge of the cutter-wheel I. Now, when the shaft N' is turned by its crank N², motion is transmitted through the friction-wheel N, pinion M², shaft M', friction-wheel M, pinion L, and shaft K to the cutter-wheel I, which has a knife-edge of tempered steel. The relation of the devices for transmitting motion is such that even when the shaft N' is turned comparatively slowly, a very rapid rotary motion will be given to the cutter-wheel. At the same time that motion is being transmitted to the cutter-wheel from shaft N' said shaft also transmits motion through the worm o, pinion P, and shaft P' to the feed-wheel Q in the direction indicated by the arrow, and thus, while the cutter-wheel is rotating, the record-strip H is drawn across its edge, and if, while this operation is going on, sounds are produced in front of the diaphragm C, said diaphragm will be caused to vibrate and operate the stem D to drive the record-strip against the cutter-wheel I with a range and force of movement corresponding to the air-vibrations set up by the sounds, and the cutter-wheel will consequently cut notches or indentations into the edge of the record-strip which represent an exact record of such sounds.

It will be readily seen that the cutter-wheel opposes but a slight resistance to the movement of the record-strip, as it is so sharp and its movements so rapid that the edge of the record-strip is easily and rapidly cut away when it is passed against the cutter, even though the strip be of a material and bulk which enable it to sustain a considerable handling and friction when used for reproducing sounds, by drawing its indented edge in contact with a stylus arranged to operate a diaphragm.

It will also be seen that a record of indefinite length may be produced, or short records may be produced in rapid succession, by feeding strips of the desired length to the cutter-wheel.

In order to keep the cutter-wheel clear of particles of metal which might adhere to it, a light spring, i, is arranged to bear against each side of said wheel, so as to scrape off the adhering cuttings. This is a great advantage over the old forms of phonographs, in which, as is well known, the extent of the record is limited by the dimensions of the plate or cylinder which supports the foil-strip.

The sounds reproduced by a record-strip formed by my machine approach more nearly the original sounds in loudness and volume than do the sounds reproduced by the old forms of records, as by my improvement so little resistance is opposed to the movement of the strip that the diaphragm has a vibration much more nearly commensurate with the sounds projected against it than is possible when the record must be produced entirely by the force of movement of the diaphragm in driving the stylus against a record-sheet.

The record-cutter need not be limited in form to a simple rotary knife-edged disk. I have contemplated using a cutter operating after the manner of a band-saw, as shown in Fig. 4, in which the letter T indicates a steel band having one of its lateral edges beveled and sharpened to act upon the record-strip.

I may also use a rim-wheel cutter, as shown in Fig. 5, in which the letter T' indicates a spoked wheel having a rim, T², one of the lateral edges of which is beveled to a knife-edge, as shown at t.

I may also form the cutter-wheel with cutting-faces, similar to a fine file, to facilitate its cutting and smoothing of the edges of the notches; but such file-faces are not essential.

In Fig. 6 is illustrated a portion of an instrument having two cutters, T³ and T⁴, between the edges of which the record-strip H passes, said strip passing also through a guide-eye, E', connected to the stem D', projecting from a diaphragm, C'. In an instrument thus constructed the complete vibration of the diaphragm in both directions is utilized for producing the record, complementary portions of the record being cut in opposite edges of the strip. If such a strip be drawn between a fixed stylus and a movable stylus attached to a reproducing-diaphragm, it is obvious that the two edges of the strip will co-operate in giving the diaphragm vibrations of extensive amplitude, and thus the reproduction of sounds will be very nearly as loud as the original.

In order to give the recording-diaphragm a capacity for free and prompt vibration, I have preferred to form said diaphragm with concentric corrugations, similar to the diaphragms of pressure-gages used for indicating steam-pressure. Such a diaphragm is shown in section in Fig. 7, in which C² indicates the diaphragm, and c² c² c² the corrugations. I have found such a diaphragm very sensitive and efficient in response to sounds.

The essential principle of my improvement may be utilized for reproducing, in durable and amplified form, the fragile records made by the old styles of phonographs. In the diagram Fig. 8 is illustrated the embodiment of my improvement in an apparatus for this purpose. The letter A² designates a cylinder which may be arranged to travel longitudinally, as well as to rotate in a manner similar to that of the cylinder of the old styles of phonographs. B³ is a lever provided with a stylus, b³, for acting upon an old record-sheet, which may be placed upon this cylinder. Said lever has an adjustable fulcrum, f', and at the end opposite the stylus carries a pressure-roller, B⁴. The letter G³ indicates a supporting-table, against which the roller B⁴ will be pressed by a spring, s⁴. This table has an opening at g³, through which plays the edge of a cutter-wheel, I⁴, which may be given a rotary motion by any suitable means. The letter H⁴ indicates a record-strip, which may be drawn under the wheel B⁴ and across the edge of the cutter-wheel, and if, while the said strip is so drawn, the cylinder A² be rotated, the record-strip thereon will vibrate the lever B³ and cause the roller B⁴ to press the record-strip in contact with the edge of the cutter-wheel with a varying pressure corresponding to the indentations of the record-sheet, which will be thus copied and given the form of a continuous strip. It is obvious that the copy may be much amplified by regulating the position of the adjustable fulcrum, so that the wheel B⁴ will be carried by a long arm having any desired proportion to a shorter arm of the lever B³, which carries the stylus.

The record-strips produced by my improved machine are peculiarly applicable for use in transmitting messages by telephone—as, for instance, should a person desiring to transmit a telephonic message be unable to send his message immediately and have no time to wait, he may prepare a record or message strip by one of my phonographs, and the telephonic operator may use the strip in transmitting the message at a future time, or in its regular order with other messages waiting until the line can be used.

In Fig. 9 the letter U indicates a portion of a telephonic transmitter which may be used for transmitting messages either directly by the voice or through the instrumentality of a record-strip. The letter U' indicates a diaphragm arranged in the mouth-piece in the usual manner, and provided on its rear surface with a carbon button, $u$, which is in contact with another carbon button, $u'$, carried by a spring, $u^2$. The carbon button $u^2$ has projecting from its rear side a stylus, $u^3$, behind which is a guide, $u^4$, for a record-strip, $h$. The diaphragm U and the spring $u^2$ are supposed to be connected with the primary circuit of an induction-coil in the usual manner. It is not necessary to explain the manner of transmitting directly by the voice; but in case a record-strip, as shown at $h$, is to be used, such strip is drawn through the guide $u^4$, with its indented or record edge in contact with the tip of the stylus $u^3$, and will vibrate said stylus longitudinally, so that the pressure between the buttons $u$ and $u'$ will be varied in correspondence with the indentations of the strip, and thus the current varied in a manner to transmit the message represented by the strip.

In Fig. 10 is illustrated another form of transmitter, in which an armature, V, is provided with a stylus, $v$, to receive the action of a record-strip, as shown at $h'$, so that said armature will be vibrated in front of the core of an electro-magnet, V', and induced undulatory currents be thus set up in the coil of the magnet in correspondence with the record, such induced currents traversing a line-wire and acting upon a receiver in the usual manner.

As before stated, the record-strip may be given various forms in cross-section—such, for instance, as illustrated in Fig. 11. H indicates the flat strip, oblong in cross-section, and with rectangular edges. H' is a strip triangular in cross-section. H² is a round strip. H³ is a flat strip having double-beveled edges, and H⁴ is a strip having sharp ribs to receive the action of the cutter. These strips may be made of any of the metals hereinbefore mentioned, or any durable material which will withstand the frictional wear and handling incident to their use. It will sometimes be found of advantage to make the record-strip of soft steel and temper or harden it after the record has been cut. Such a strip will obviously be extremely durable.

Having now fully described my invention and explained the operation thereof, I wish it to be understood that I do not confine myself to the precise details of construction shown in my drawings and heretofore particularly described, but may vary the same in any manner for the better carrying out the essential principles of my improvement.

What I claim is—

1. In a phonograph, the combination, with means for moving a record-strip by sound, of one or more moving cutters arranged to act upon said strip, substantially as described, and for the purpose set forth.

2. In a phonograph, the combination, with the diaphragm and the moving cutter arranged to act upon a strip vibrated by said diaphragm, of feeding mechanism adapted to move a record-strip across the edge of the cutter, substantially as described.

3. In a phonograph, the combination, with the diaphragm and two moving cutters, of feeding mechanism adapted to move a continuous strip between said cutters, and intermediate devices for transmitting a vibratory motion to said strip from the diaphragm, so that the opposite edges of said strip will be alternately pressed against the cutters, respectively.

4. A phonograph-record consisting of a metallic strip having record-indentations of varying character representing sound-waves caused by articulate speech cut through one or more of its edges, substantially as described.

5. The herein-described method of preparing phonographic records, the same consisting in vibrating a record-strip by sounds and causing said strip to be cut during and in proportion to its vibration by a cutting-instrument operated independently of the diaphragm, substantially as described.

In testimony whereof I have signed this specification in the presence of two subscribing witnesses.

CHRISTOPHER COLUMBUS REYNOLDS.

Witnesses:
   GEO. W. CURTIS,
   WILLIAM WILKERSON.